No. 882,782.

PATENTED MAR. 24, 1908.

T. J. HRUBY.
ROLLER SKATE.
APPLICATION FILED DEC. 9, 1907.

Witnesses:

Inventor:
Thomas J. Hruby.

UNITED STATES PATENT OFFICE.

THOMAS J. HRUBY, OF CHICAGO, ILLINOIS.

ROLLER-SKATE.

No. 882,782.      Specification of Letters Patent.      Patented March 24, 1908.

Application filed December 9, 1907. Serial No. 405,679.

*To all whom it may concern:*

Be it known that I, THOMAS J. HRUBY, a citizen of the United States, residing at Chicago, in the county of Cook and State of Illinois, have invented a new and useful Improvement in Roller-Skates, of which the following is a specification.

My invention relates, more particularly, to improvement in the bearings for the rollers of roller-skates; and my primary object is to provide a construction of ball-bearing skate which shall be of simple construction and inexpensive to manufacture.

Figure 1:
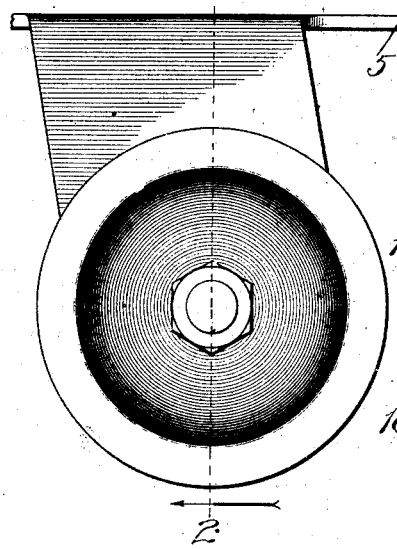
Figure 2:
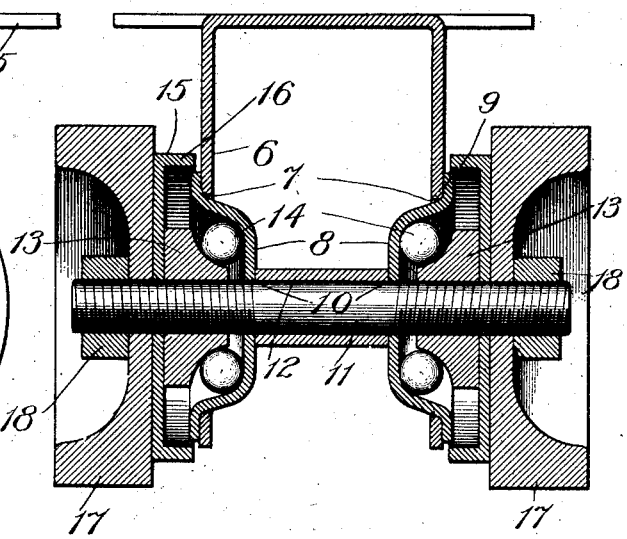
Figure 3:
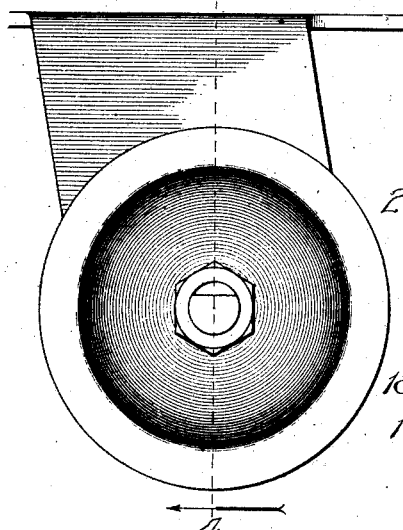
Figure 4:
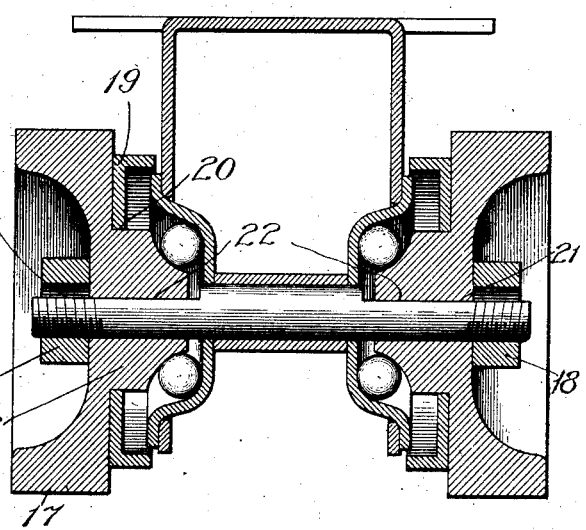

Referring to the accompanying drawing—Figure 1 shows, by a view in broken side elevation, the rear of a roller-skate embodying my invention; Fig. 2 is a section taken at line 2 on Fig. 1 and viewed in the direction of the arrow; Fig. 3 is a view similar to that of Fig. 1 showing another embodiment of my invention; and Fig. 4 is a section taken at the line 4 on Fig. 3, and viewed in the direction of the arrow. One end of a foot-plate of a skate is represented at 5 and has depending from it a support. It is preferred that this support be formed of two brackets 6, 6, with relatively large openings 7 through them near their lower ends for receiving cones 8, 8, each of which opens outwardly, as represented in Fig. 2, and which are preferably stamped out of sheet-metal to afford the flanges 9, which, when the cones are positioned in the openings 7, abut against the outer faces of the brackets 6. These cones are provided with central alining openings 10, 10 for receiving an axle 11 which extends at its opposite ends beyond the brackets 6, a tubular member 12 surrounding the axle and bearing against the inner faces of the cones 8 serving to reinforce the brackets 6, to resist strains to which roller-skates are subjected.

The axle 11 which is oppositely threaded at its end-portions, as represented, has cones 13, 13 screwed upon it from its opposite ends into engagement with two series of balls 14, 14 of the hard metal usually employed, which latter are thus confined between the two pairs of cones each formed of a cone 8 and a cone 13. Against the outer faces of each cone are screwed on the axle dust-pans 15 having annular flanges 16 serving to practically close the space between each pair of cones, and thus prevent freedom of access to the bearings of dust and dirt. The rollers proper 17, which preferably are dished as presented, screw on to the axle 11 from its opposite ends against the dust-pans 15, nuts 18 being applied on the opposite ends of the axles beyond the rollers for the usual purpose. It is thus apparent that in use the axle rotates with the rollers 17, and that the balls confined between each pair of cones afford the desired ball-bearing. By so constructing the skate the use of but two pairs of cones and but two sets of balls are required for each set of rollers, with the result of greatly simplifying and cheapening the structure.

The construction shown in Figs. 3 and 4 is the same as that shown in Figs. 1 and 2, with the exception that instead of forming the rollers 17 and cones 13 of separate parts, the roller and cone for each side are made integral with a dust-pan 19 applied to the cone at an opening 20. The axle 11 instead of being round throughout its length, has a portion of its circumference cut away at both ends, as illustrated at 21 in Fig. 4, and the integral rollers 17 and cones 13 instead of having round openings through them to receive the axle, as is the case with these parts in the construction shown in Fig. 2, have openings 22 corresponding in shape with the shape of the ends of the axle 11. Thus the rollers 17 and cones 13 instead of screwing on to the axle 11, are slipped on to it from its opposite ends to cause the cones to be brought to the proper position relative to the balls, after which the nuts 18 are applied to the axle in the usual manner.

The rollers 17 and cones 13 are caused to turn with the axle 11 by reason of the engagement of the flattened surfaces of the axle with the correspondingly flattened surfaces of the openings 22.

It is manifest that the cones 13 and rollers 17 may be made in one piece and screw on to the shaft, or that these rollers and cones may be made in separate pieces with openings as described of the integrally formed rollers and cones of Fig. 4.

What I claim as new, and desire to secure by Letters Patent, is—

1. In a ball-bearing roller-skate, the combination of a support connected with the foot-plate, cones on said support opening outwardly, an axle extending through said cones and carrying cones beyond said first-named cones between which and the cones on the axle the balls forming the bearings are confined, and rollers fixed on the axle to rotate therewith.

2. In a ball-bearing roller-skate, the combination of a support connected with the foot-plate and provided with openings extending transversely of the skate, dish-shaped cones provided with circumferential flanges fitting in the openings in said support to open outwardly with their flanges fitting flatwise against the supports, an axle extending through said cones, cones carried by the axle beyond said first-named cones between which and the cones on the axle the balls forming the bearings are confined, and rollers fixed on the axles beyond the cones.

3. In a ball-bearing roller-skate, the combination of two depending brackets formed integrally with the foot plate and having openings in their lower end-portions, dish-shaped cones fitting in said openings to open outwardly and provided with flanges about their circumferences fitting flatwise against said brackets, an axle extending through said cones, cones carried by the axle beyond said first-named cones between which and the cones on the axle the balls forming the bearings are confined, and rollers fixed on the axle beyond the cones.

4. In a ball-bearing roller-skate, the combination of a support connected with the foot-plate, cones on said support opening outwardly, an axle extending through said cones, and rollers fixed on the shaft and provided with cones formed integrally with the rollers between which said last-named cones and the cones on the support the balls forming the bearings are confined.

THOMAS J. HRUBY.

In presence of—
L. HEISLAR,
R. SCHAEFER.